(12) United States Patent
Griffiths et al.

(10) Patent No.: US 8,070,568 B1
(45) Date of Patent: Dec. 6, 2011

(54) HIDE-ON WASHER FOR BEEF CARCASSES

(76) Inventors: Terry Cemlyn Griffiths, Carlton, GA (US); Larry Paul Griffiths, Overton, NV (US); Duane Dutton, Pueblo West, CO (US); Janice Dutton, legal representative, Pueblo West, CO (US); Greg Bilyeu, Chanute, KS (US)

( * ) Notice: Subject to any disclaimer, the term of this patent is extended or adjusted under 35 U.S.C. 154(b) by 0 days.

(21) Appl. No.: 12/836,192

(22) Filed: Jul. 14, 2010

Related U.S. Application Data

(60) Provisional application No. 61/228,998, filed on Jul. 28, 2009.

(51) Int. Cl.
*A22C 17/08* (2006.01)
(52) U.S. Cl. ........................................ 452/173; 452/123
(58) Field of Classification Search .................. 452/123, 452/173
See application file for complete search history.

(56) References Cited

U.S. PATENT DOCUMENTS

| | | | | |
|---|---|---|---|---|
| 554,707 A | * | 2/1896 | Michner | 452/173 |
| 882,719 A | * | 3/1908 | Smith | 452/173 |
| 1,941,118 A | * | 12/1933 | Thompson et al. | 452/123 |
| 3,523,324 A | * | 8/1970 | Debaere | 452/173 |
| 3,711,895 A | * | 1/1973 | Arendale | 452/173 |
| 3,806,978 A | * | 4/1974 | Takeuchi | 15/53.3 |
| 4,179,772 A | * | 12/1979 | Harben, Jr. | 452/90 |
| 4,514,879 A | * | 5/1985 | Hazenbroek | 452/91 |
| 5,197,916 A | * | 3/1993 | Orlando et al. | 452/125 |
| 5,979,002 A | * | 11/1999 | Anderson | 15/53.2 |
| 6,318,298 B1 | * | 11/2001 | Nonay | 119/609 |
| 7,387,565 B1 | | 6/2008 | Griffiths et al. | |
| 7,467,994 B2 | | 12/2008 | Griffiths et al. | |
| 7,481,184 B2 | * | 1/2009 | van der Poel | 119/621 |

* cited by examiner

*Primary Examiner* — David Parsley
(74) *Attorney, Agent, or Firm* — Ronald E. Smith; Smith & Hopen, P.A.

(57) ABSTRACT

An apparatus for cleaning a carcass includes an elongate housing having a forward and a rearward frame disposed in parallel, transversely opposed relation to one another. The elongate housing includes a plurality of stations. At least one rotating device at each station is disposed on the forward or rearward frame. A first station may include a pair of transversely opposed counter-rotating devices disposed at a common downward angle relative to a longitudinal axis of the elongate housing. A second station includes a plurality of rotating devices positioned near the top of the apparatus to clean the hoof and ankle area. A third station includes a plurality of vertically stacked rotating devices. A fourth, fifth, and sixth station include plural rotating devices in axial alignment with one another that are collectively oriented in a predetermined downward slope relative to the longitudinal axis to clean a carcass from top to bottom.

18 Claims, 9 Drawing Sheets

HIDE-ON WASHER FOR BEEF CARCASSES

CROSS REFERENCE TO RELATED APPLICATIONS

This application claims priority to currently pending U.S. Provisional Patent Application No. 61/228,998, entitled "HIDE-ON WASHER FOR BEEF CARCASSES", filed Jul. 28, 2009, which is hereby incorporated by reference.

BACKGROUND OF THE INVENTION

1. Field of the Invention

This invention relates, generally, to devices that clean animal carcasses. More particularly, it relates to a hide-on washer that removes organic matter from animal carcasses.

2. Description of the Prior Art

The purpose of washing animal carcasses after slaughter and prior to hide removal is to reduce or remove organic matter and pathogens that are likely to be present on all carcasses, thus lessening the chances of cross-contamination from hide to raw meat.

A problem exists in cleaning whole animal carcasses after they have been killed and prior to the hide being removed. Conventional hide-on carcass washing, whether manual or mechanical, uses high volumes of water often boosted to high pressures.

The known conventional methods are inadequate to remove sufficient amounts of organic material and pathogens.

However, in view of the prior art considered as a whole at the time the present invention was made, it would not have been obvious to those of ordinary skill in the art how to develop an apparatus capable of removing such organic material and pathogens from a carcass in a more effective manner.

SUMMARY OF THE INVENTION

The long-standing but heretofore unfulfilled need for an improved method and apparatus for removing organic material and pathogens from an animal carcass is now met by a new, useful, and non-obvious invention.

The novel apparatus for cleaning a carcass includes an elongate housing or enclosure that includes a main frame that includes a forward frame and a rearward frame disposed in parallel, transversely opposed, spaced apart relation to one another. The elongate housing includes a plurality of stations, there being at least one frame-mounted rotating device at each station. Two rotating devices may be disposed on opposing forward and rearward frames in said parallel, transversely opposed, spaced apart relation to one another so that a carcass transported between them is cleaned from both sides. In some applications, a carcass may be cleaned on only one side by only one rotating device, i.e., the invention is not limited to a pair of counter-rotating devices at each station.

Each rotating device includes a large plurality of radially outwardly extending strand elements secured thereto.

The rotating devices are placed on one or both sides of the animal carcass. The mechanical action and the contact of the strand elements that physically strike the carcass as the rotating devices rotate, together with an application of water, cooperate to clean the carcass. More particularly, the strand elements, together with water under pressure or a combination of water under pressure and chemicals, remove unwanted organic and foreign matter from hooves, legs and the rest of the carcass.

A first station of the plurality of stations includes a rotating device or two counter-rotating devices. The rotating device or devices are mounted so that they can be disposed either horizontally or at different angles relative to horizontal, such as at a downward slope of twenty five degrees (25°) or an upward slope of twenty five degrees (25°). Moreover, the rotating device or devices of the first station are mounted on a frame or frames and the opposite ends of the frame or frames are slideably mounted on longitudinally spaced apart, vertical poles so that the frame or frames and hence the rotating device or devices may be positioned and locked into position at any preselected elevation. The rotating devices of the first station, like all of the rotating devices in apparatus 10, rotate in a downward direction so that contaminates are directed to the floor of the apparatus.

A second station of the plurality of stations is positioned longitudinally downstream from the first station. The rotating devices of the second station are positioned near the top of machine 10. The second station preferably includes a first set of two longitudinally spaced apart rotating devices that are mounted to a first pivotally mounted frame that is connected to the rearward frame of the apparatus and a second set of two longitudinally spaced apart rotating devices that are mounted to a second pivotally mounted frame that is connected to the forward frame of the apparatus. The four rotating devices are in substantial longitudinal alignment with one another, and all four rotating devices rotate about a vertical axis. The number four is not critical, and more or fewer rotating devices at said second station are within the scope of this invention.

Significantly, the rotating devices are positioned substantially midway between the forward and rearward frames of the machine, i.e., along the longitudinal axis of symmetry of apparatus 10 when said apparatus is viewed n plan view. Each pivotally mounted frame is urged toward the longitudinal axis of symmetry by a suitable bias means. Accordingly, as the hooves of an inverted carcass that is being transported down the centerline of the machine encounter the first pair of rotating devices, said first pair of rotating devices bear against a first side of the hooves but are pushed out of the way, momentarily overcoming the bias means, as the carcass moves along said centerline in a path of travel from the entrance of the apparatus to an exit thereof. The hooves then encounter the next set of rotating devices and displace them as well, but in an opposite direction, as the bias means associated with said next set of rotating devices is also momentarily overcome.

A third station includes a plurality of vertically stacked rotating devices. As in the first station, the rotating devices may be mounted to the forward main frame only, the rearward main frame only, or both. Each rotating device of the third station has a leading bracket secured to a first vertical frame piece and a trailing bracket secured to a second vertical frame piece that is longitudinally spaced apart from the first vertical frame piece. This enables each rotating device of the third station to be positioned at multiple angles relative to horizontal.

In a preferred embodiment, a total of six (6) rotating devices are provided at the third station, there being three (3) rotating devices mounted on the forward main frame and three (3) rotating devices mounted on the rearward main frame. The number of rotating devices is not critical and more or fewer rotating devices are within the scope of this invention. All of the rotating devices at the third station are preferably mounted at a common angle such as an upward angle of twenty five degrees (25°) relative to horizontal and relative to the path of travel of the carcass through the apparatus.

A fourth station includes a rotating device, downstream from the third station, having an axis of rotation that is oriented at a predetermined slope relative to a longitudinal axis of the apparatus. The rotating device of the fourth station is positioned at an elevation near the top of apparatus 10.

A fifth station includes a rotating device, downstream from the fourth station, having an axis of rotation that is also oriented in a predetermined slope relative to a longitudinal axis of the apparatus. The rotating device of the fifth station is positioned at an elevation about mid-way between the top and bottom of apparatus 10.

A sixth station includes a rotating device, downstream from the fifth station, having an axis of rotation that is also oriented in a predetermined slope relative to a longitudinal axis of the apparatus. The rotating device of the sixth station is positioned at an elevation near the bottom of apparatus 10.

The respective axes of rotation of the rotating devices of the fourth, fifth, and sixth stations are in substantial axial alignment with one another. In a preferred embodiment, each rotating device is oriented in a downward twenty five degree (25°) slope relative to horizontal. Accordingly, after the carcass is scrubbed by the upwardly sloping, downwardly rotating, vertically stacked rotating devices of the third station, it is then scrubbed by the downwardly sloped, downwardly rotating, axially aligned rotating devices of the fourth, fifth, and sixth stations. As in the other stations, each rotating device of the fourth, fifth, and sixth stations may or may not have a confronting, transversely opposed counterpart.

The primary object of this invention is to provide an apparatus that removes organic material and pathogens from a food animal carcass.

Another important object is to attain the first object in a manner that conserves water and chemicals.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
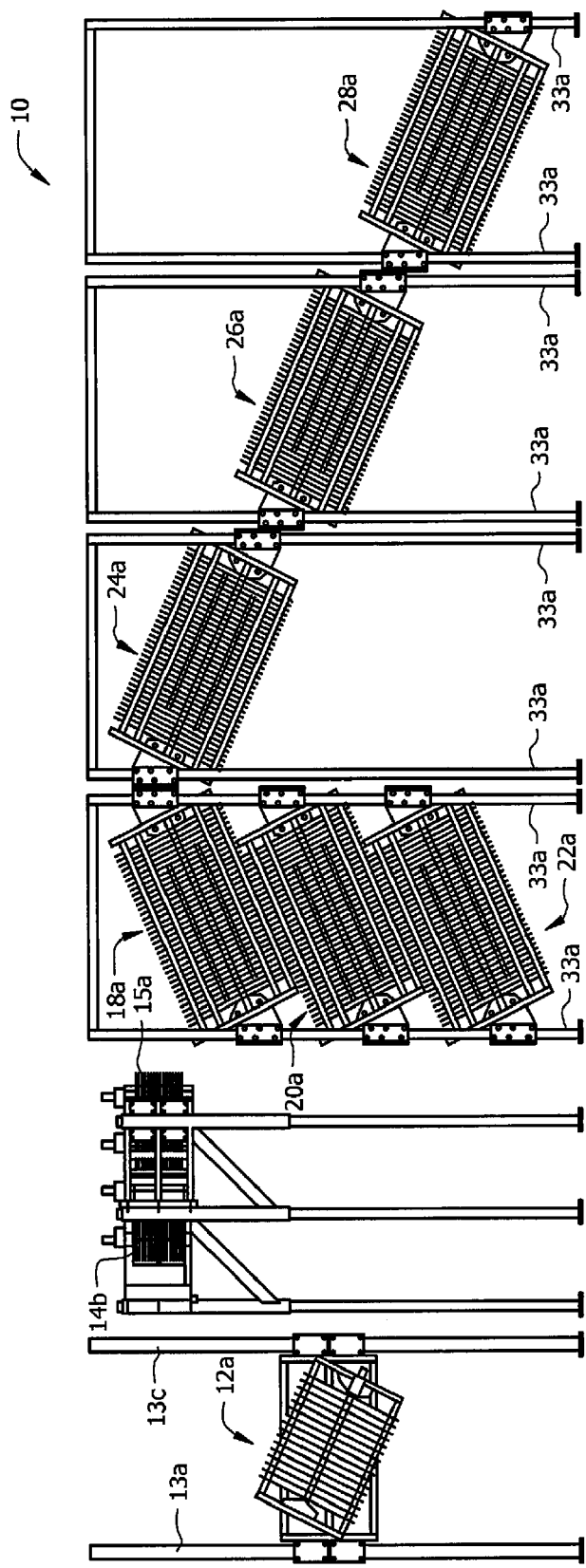
FIG. 1 is a side elevational view of the novel hide-on washer.
Figure 2:
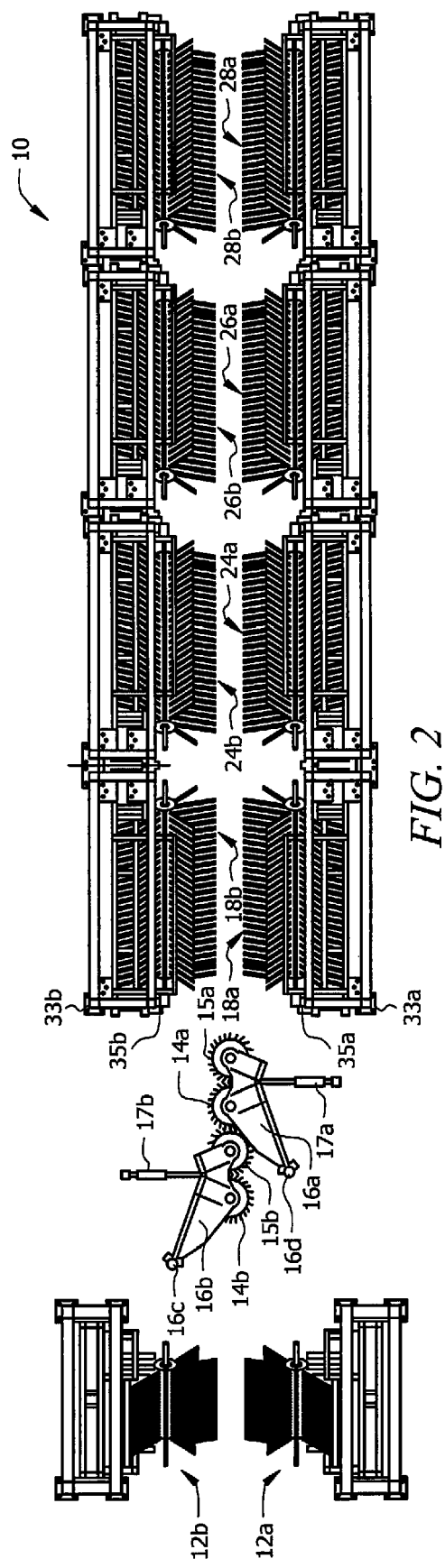
FIG. 2 is a top plan view of the structure depicted in FIG. 1.

A diagrammatic representation of a first embodiment of the novel hide-on washer is denoted as a whole by the reference numeral 10 in FIGS. 1 and 2. A carcass, not shown, travels from left to right as drawn in said Figs. It is transported through apparatus 10 by a conventional overhead conveyance system, not shown.

As best understood by comparing FIGS. 1 and 2, the carcass travels primarily between parallel, transversely opposed, longitudinally arranged sets of rotating devices as it is transported through apparatus 10. The opposing rotating devices counter-rotate with respect to one another so that the carcass is brushed downwardly.

However, the preferred embodiment, as depicted, also includes a set of rotating devices known as hoof brushes, hereinafter disclosed, that are not transversely opposed with respect to one another.

In all embodiments, the rotating devices secure a large plurality of nylon bristles, elongated strips, or both, placed in longitudinal alignment with one another and in circumferential array about the axis of rotation of the rotating device. The elongate strips may take the form of molded rubber whips as disclosed in U.S. Pat. No. 7,387,565, which is hereby incorporated into this disclosure by reference.

Also in all embodiments, most of the rotating devices include axles that may be positioned at varying angles relative to a horizontal longitudinal axis. The above-mentioned hoof brushes, however, are always positioned so that they rotate about a vertical axis.

A wetting agent may be applied to the carcass prior to entry into apparatus 10 at the option of the operator. Water or chemicals, or a combination of water and chemicals, are applied to the carcass as it is transported through apparatus 10 by a system of fluid headers and nozzles, not depicted. Such a system of fluid headers and nozzles is disclosed in U.S. Pat. No. 7,467,994, which is hereby incorporated into this disclosure by reference.

The rotating devices mounted on apparatus 10 make mechanical contact with the carcass, thereby providing enhanced cleaning over water-only or water and chemicals-only cleaning devices that lack such physical contact.

A carcass first encounters rotating devices 12a and 12b that are preferably mounted on the forward and rearward sides of apparatus 10, respectively. However, an embodiment that includes a single rotating device 12a or 12b is also within the scope of this invention.

Rotating devices 12a, 12b are depicted in this example as being mounted at a downward angle of about twenty five degrees (25°) relative to a longitudinal axis of apparatus 10 and relative to the path of travel of the carcass through apparatus 10. That angle is not critical and can be changed to accommodate carcasses of differing sizes, shapes, and contaminated areas. A longitudinal axis is defined as being horizontal and coincident with or parallel to the path of travel of the carcass through the apparatus. A transverse axis is horizontal and perpendicular to a longitudinal axis. As depicted in the Figures, the longitudinal extent of apparatus 10 exceeds its transverse extent.

Figure 3:
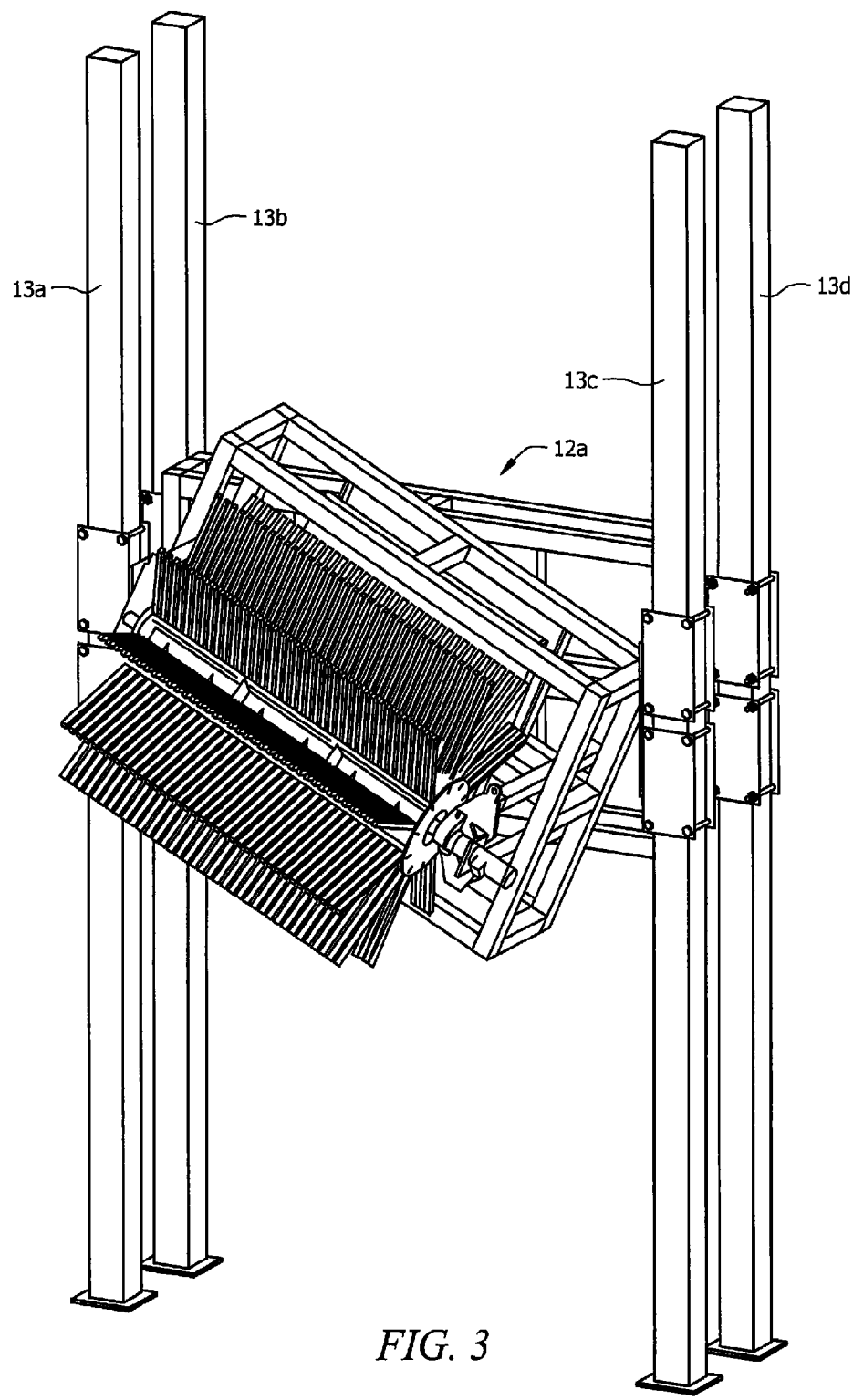
FIG. 3 is a perspective view of one of the brushes of the novel apparatus.

Rotating devices 12a and 12b are also adjustably mounted on vertical poles 13a, 13b, 13c, and 13d, respectively, as best depicted in FIG. 3, so that they can be placed at any height along the extent of said poles and locked into position. This enables rotating devices 12a and 12b to cooperatively clean any area of the carcass that may be heavily laden with foreign matter which may require additional cleaning.

After passing between forward and rearward rotating devices 12a and 12b, the carcass continues from left to right through enclosure 10 and next encounters a total of four (4) rotating devices including rotating devices 14b, 15b and 14a, 15a that are positioned near the top of apparatus 10. The number of such rotating devices may vary depending on plant needs and available space. Said rotating devices 14b, 15b, 14a, 15a clean the hoof and ankle area of a carcass.

Rotating devices 14b, 15b are mounted to the rear main frame of apparatus 10 and rotating devices 14a, 15a are mounted to the forward main frame as is clear from the plan view of FIG. 2.

More particularly, devices 14b, 15b are mounted on frame 16b that is pivotally secured as at 16c to the rear main frame. Bias means 17b, also secured to the rear main frame, urges rotating devices 14b, 15b away from said rear main frame. Devices 14a, 15a are mounted on frame 16a that is pivotally secured as at 16d to the forward main frame. Bias means 17a, also secured to the forward main frame, urges rotating devices 14a, 15a away from said forward frame. Bias means 17a and 17b thus urge their respective rotating devices toward the centerline or longitudinal axis of symmetry of apparatus 10, midway between the forward and rearward main frames of apparatus 10.

The carcass is inverted as it travels through apparatus 10. The hoof area thus first encounters rotating devices 14b, 15b that are positioned in substantial alignment with the longitudinal axis of symmetry of apparatus 10 as depicted in FIG. 2. The hooves will bear hard on a first side thereof against rotating devices 14b, 15b, momentarily urging said rotating devices to pivot out of the path of travel of the hooves against the bias of bias means 17b. The hooves will then bear hard on an opposite side thereof against rotating devices 14a, 15a, momentarily urging said rotating devices to pivot out of the path of travel of the hooves against the bias of bias means 17a.

After the hooves of the carcass have traveled through the hoof brushes, the carcass then encounters stacked rotating devices 18a, 18b, 20a, 20b, and 22a, 22b. Rotating device 20b is obscured in FIG. 1 by rotating device 20a and in FIG. 2 by rotating device 18b. Rotating device 22b is obscured in FIG. 1 by rotating device 22a and in FIG. 2 by rotating device 18b.

The third station of apparatus 10 includes stacked rotating devices 18a, 18b, 20a, 20b, and 22a, 22b that are angled upwardly as depicted at an angle of about twenty five degrees (25°) relative to a longitudinal axis of apparatus 10. This angle is not critical and can be changed. Any angle, including no angle (horizontal placement) is within the scope of this invention. However, horizontal orientation of the third station rotating devices requires more rotating devices because the vertical coverage area is reduced by such horizontal orientation. As disclosed in FIGS. 7-9, when the rotating devices are in a horizontal configuration, they must be staggered with respect to one another as more fully disclosed below in connection with said FIGS. 7-9.

Carcass contact of rotating devices 18a, 18b, 20a, 20b, and 22a begins at the lower extremities of the carcass and extends in an upward orientation as the carcass travels from left to right in FIG. 1 as drawn. This contact removes unwanted matter from the lowest area of a carcass to the highest.

The carcass next sequentially encounters rotating devices 24a, 24b in a fourth station of apparatus 10, 26a, 26b in a fifth station, and 28a, 28b in a sixth station. The rotating devices of the fourth, fifth, and sixth stations are in substantial axial alignment with one another and are collectively oriented in a downward slope of about twenty five degrees (25°) relative to a longitudinal axis of apparatus 10 at differing heights as depicted. The twenty five degree (25°) angle is not critical and can be changed. Any angle, including horizontal, is within the scope of this invention. However, as already mentioned in connection with the third station, horizontal placement of the rotating devices requires more rotating devices to clean the carcass over the vertical extent that needs to be cleaned.

In the preferred embodiment, brushes 24a, 24b of the fourth station are mounted at a first, uppermost elevation, brushes 26a, 26b of the fifth station are mounted at a second, mid-apparatus elevation, and brushes 28a, 28b of the sixth station are mounted at a third, lowermost elevation.

If the angle of stacked rotating devices 18a, 18b, 20a, 20b, and 22a, 22b of the third station is changed from an upward incline to a downward incline, then the depicted downward incline of rotating devices 24a, 24b, 26a, 26b, and 28a, 28b of the fourth, fifth, and sixth stations, respectively, would be changed to an upward inclination, i.e., the angle of said two sets of rotating devices is preferably an opposite angle. The reflective angles give contact on both the leading and trailing edges of the carcass.

In the depicted example, rotating devices 24a, 24b, 26a, 26b, and 28a, 28b first contact the carcass at the upper extremities of the carcass and extends in a downward and reverse orientation to that of rotating devices 18a, 18b, 20a, 20b, and 22a, 22b. This contact removes unwanted matter from the lowest area to the highest at the third station and from the highest area to the lowest at the final fourth, fifth, and sixth stations.

The carcass then exits enclosure or housing 10 and enters a carcass water removal system that incorporates elements disclosed in U.S. Pat. No. 7,387,565 to have the water removed from the cut pattern of the hide.

Figure 4:
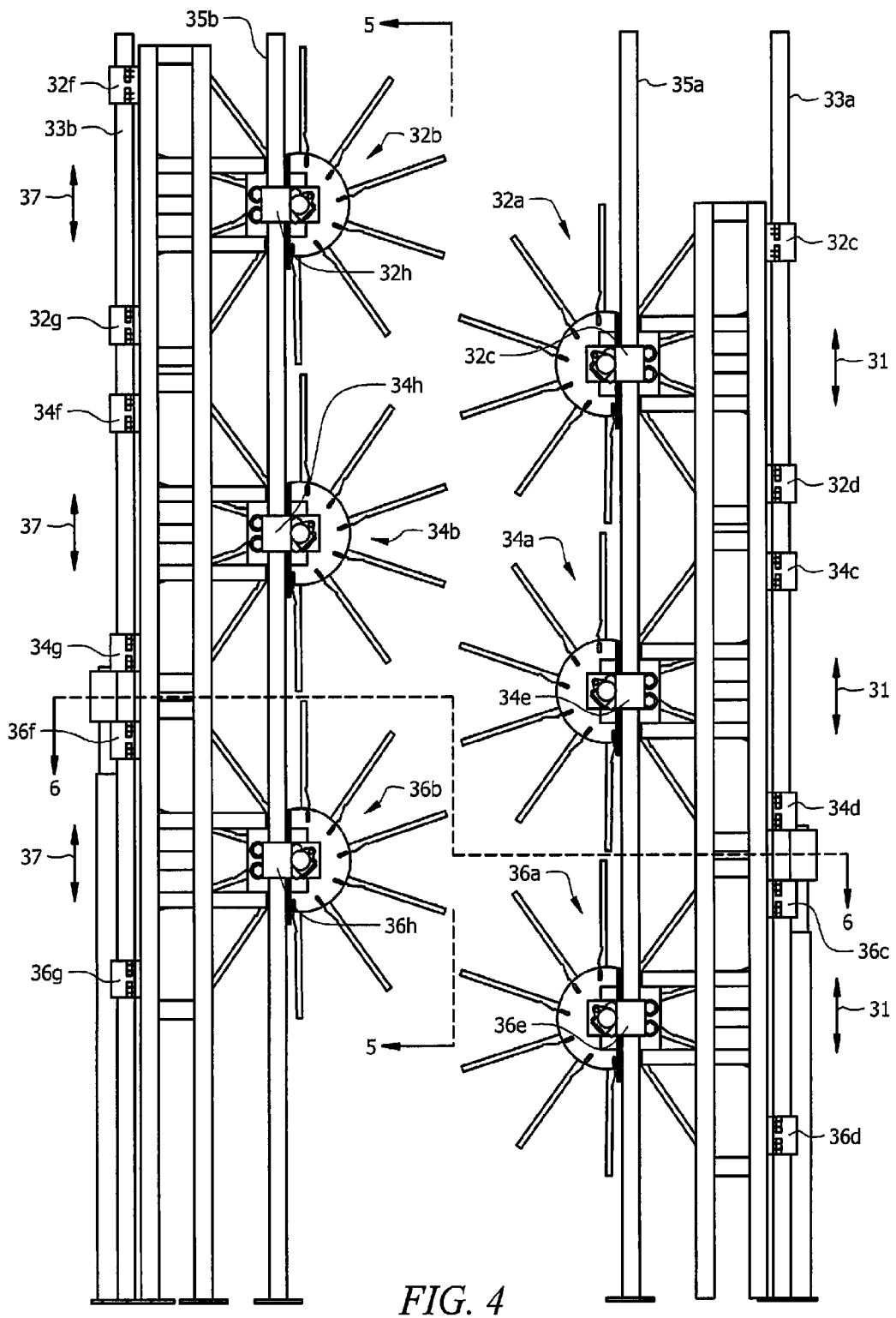
FIG. 4 is an end view of an embodiment having a plurality of horizontally oriented rotating devices in a vertically stacked configuration.
Figure 5:
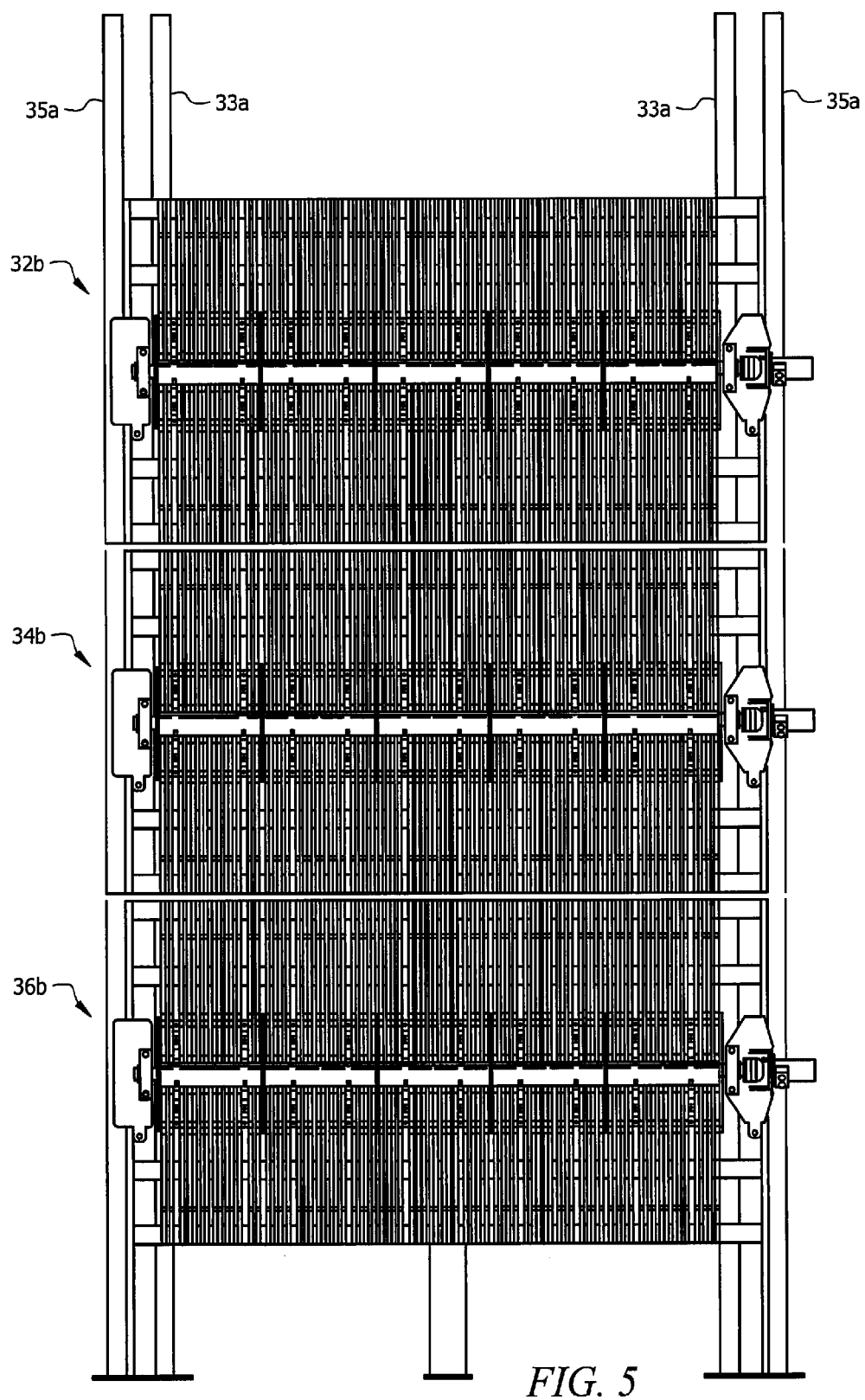
FIG. 5 is a view taken along line 5-5 in FIG. 4.
Figure 6:
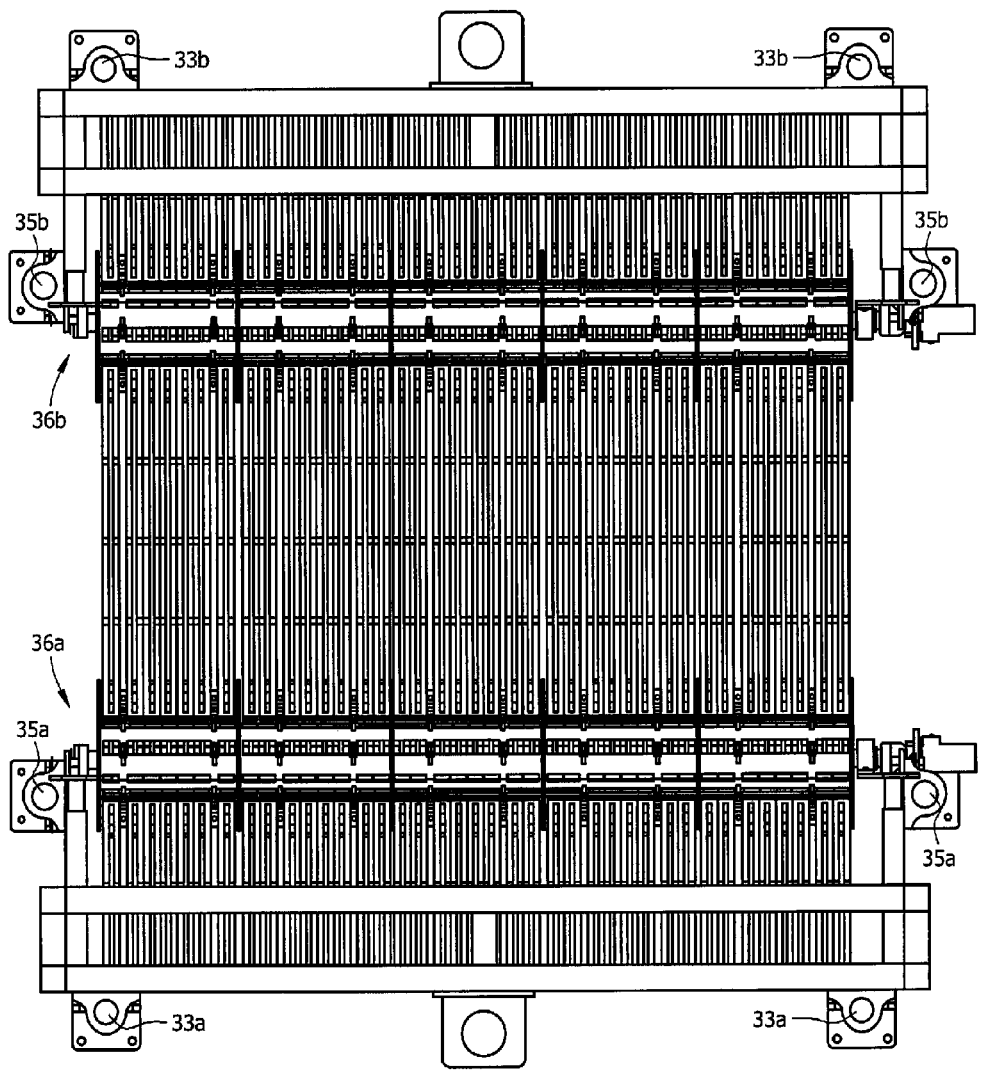
FIG. 6 is a view taken along line 6-6 in FIG. 4.

FIGS. 4, 5 and 6 depict an embodiment where the angled rotating devices of the third and fourth stations are replaced by horizontally disposed, vertically stacked rotating devices 32a, 32b, 34a, 34b, and 36a, 36b. FIG. 5 provides a side elevational-sectional view thereof and FIG. 6 provides a plan-sectional view thereof. Significantly, the respective axes of rotation of rotating devices 32a, 34a, and 36a are vertically staggered relative to the respective axes of rotation of rotating devices 32b, 34b, and 36b as best understood from FIG. 4.

Rotating device 32a is slideably mounted to vertical frames 33a and 35a as at 32c, 32d, and 32e. Rotating device 34a is slideably mounted to vertical frames 33a and 35a as at 34c, 34d, and 34e. Rotating device 36a is slideably mounted to vertical frames 33a and 35a as at 36c, 36d, and 36e. A hydraulic cylinder causes said movably mounted rotating devices 32a, 34a, and 36a to reciprocate vertically as indicated by the double-headed directional arrows collectively denoted 31 in FIG. 4.

Rotating device 32b is slideably mounted to vertical frames 33b and 35b as at 32f, 32g, and 32h. Rotating device 34b is slideably mounted to vertical frames 33b and 35b as at 34f, 34g, and 34h. Rotating device 36b is slideably mounted to vertical frames 33a and 35a as at 36f, 36g, and 36h. A hydraulic cylinder causes said movably mounted rotating devices 32b, 34b, and 36b to reciprocate vertically a predetermined distance as indicated by the double-headed directional arrows collectively denoted 37 in FIG. 4. The predetermined distance is equal to the distance between two shaft centers.

The up and down travel compensates for the vertical coverage area lost when the rotating devices are in a horizontal configuration, i.e., the staggering of rotating devices and their respective vertical reciprocations ensures that the gaps between vertically contiguous rotating devices are eliminated so that the entire carcass is cleaned. However, the vertical motion requires that the rotating devices be movably mounted as disclosed, thereby increasing the expense of the installation. The two (2) hydraulic cylinders add further expense.

Figure 7:
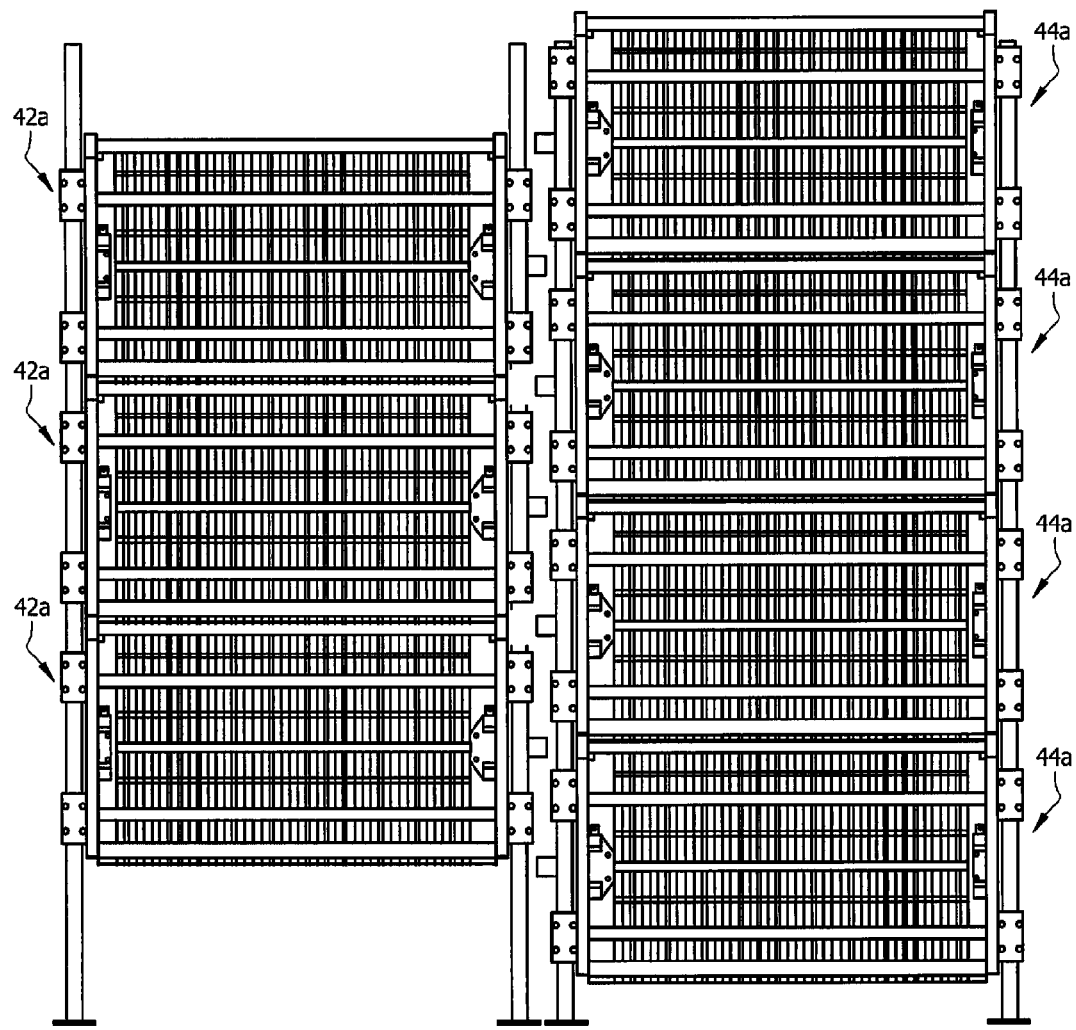
FIG. 7 is an end view of an embodiment having a plurality of horizontally oriented rotating devices in a vertically stacked configuration.
Figure 8:
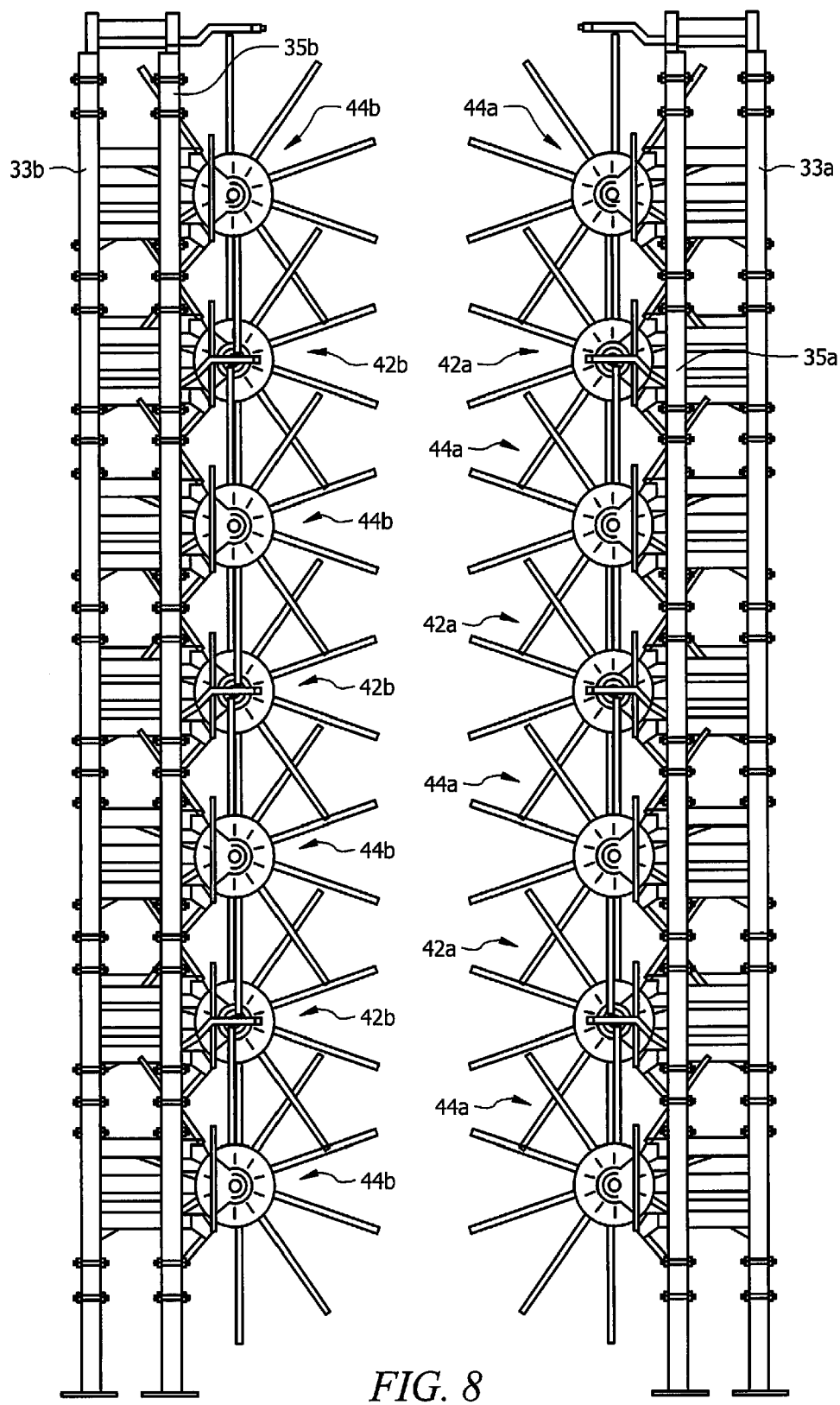
FIG. 8 is a side elevational view of the apparatus depicted in FIG. 7.
Figure 9:
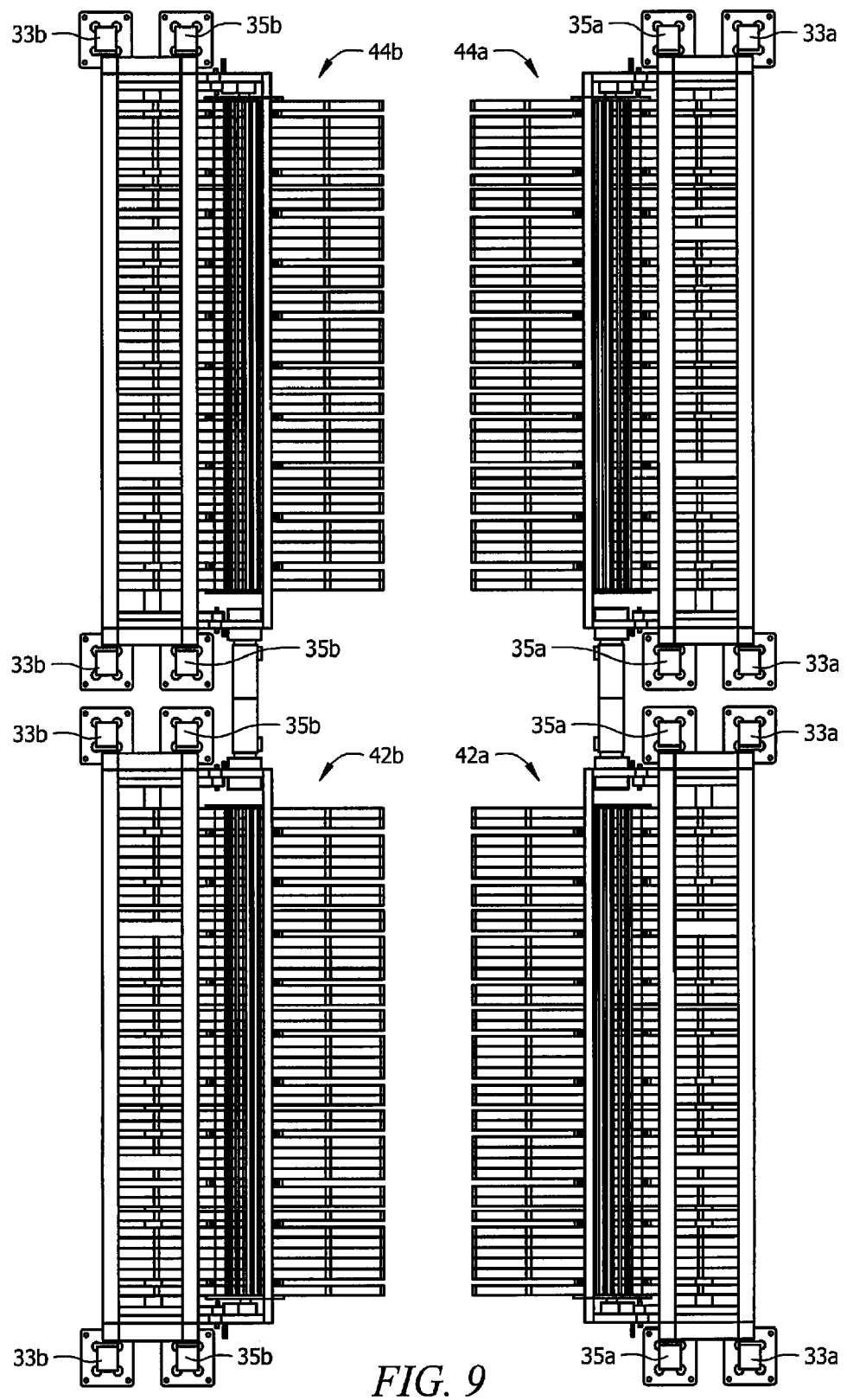
FIG. 9 is a top plan view of the apparatus depicted in FIGS. 7 and 8.

Accordingly, in installations where the embodiment of FIGS. 1-3 cannot be installed due to insufficient space, and where the extra expense of the vertically reciprocating, horizontally mounted rotating devices of FIGS. 4-6 is not justified, the embodiment of FIGS. 7-9 may be advantageously employed.

The embodiment of FIGS. 7-9 eliminates the vertical motion and the hydraulic cylinders but has the disadvantage of requiring more rotating devices to cover the same vertical extent.

FIG. 7 depicts a three (3) stack unit of horizontally disposed rotating devices in longitudinal, spaced apart alignment with a four (4) stack unit of horizontally disposed rotating units. These rotating devices may be used to supplant the third or other higher numbered-stations of the preferred embodiments disclosed above, i.e., they follow the first and second stations. The rotating devices of the three (3) stack unit are collectively denoted 42a and the rotating devices of the four (4) stack unit are collectively denoted 44a. The respective axes of rotation of the first, three (3) stack unit are vertically staggered with respect to respective axes of rotation of the second, four (4) stack unit.

FIG. 8 depicts the embodiment of FIG. 7 in end view.

The rotating devices 42a of the three (3) stack unit fill the gaps left by the rotating devices 44a of the four (4) stack unit. Both stacks are therefore required for full coverage.

FIG. 9 is a top plan view of the structure depicted in FIGS. 7 and 8. However, in some installations the vertical stack or stacks of rotating devices 42a, 44a may have no transversely opposed counterparts 42b. 44b. Such an installation occurs, for example, when the customer requires cleaning of only one side of the carcass, typically the belly side and not the back.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An apparatus for cleaning a carcass, comprising:

an elongate housing formed by a main frame, said elongate housing including a plurality of stations where each station has at least one rotating device rotatably mounted to said main frame;

said main frame having a horizontal longitudinal axis and a horizontal transverse axis, said main frame having a longitudinal extent and a transverse extent, said longitudinal extent exceeding said transverse extent;

said main frame including an overhead conveyance system for transporting a carcass in a horizontal path of travel that extends along the longitudinal extent of said main frame;

said carcass being suspended from a top of said overhead conveyance system so that said carcass lies in a substantially vertical plane under the influence of gravity as it is transported from an entrance end of said elongate housing to an exit end of said elongate housing along said, horizontal path of travel, said top of said overhead conveyance system having a height that exceeds a vertical extent of said carcass in said substantially vertical plane;

said main frame including a first station including a first set of two vertical, parallel posts that are longitudinally spaced apart from one another;

each post of said parallel posts of said first set having a common height that exceeds the vertical extent of said carcass in said substantially vertical plane;

a first frame mounted in interconnecting relation to said parallel posts of said first set;

said first frame being adjustably mounted to said parallel posts of said first set at any preselected height along said vertical extent of said parallel posts of said first set;

a first station first rotating device mounted to said first frame, said first station first rotating device having an axis of rotation that is angularly adjustable relative to said horizontal longitudinal axis; and said first station first rotating device being mounted for rotation in a first predetermined direction.

2. The apparatus of claim 1, further comprising:

said first station including a second set of two upstanding, parallel posts that are longitudinally spaced apart from one another, said second set being transversely opposed to said first set;

each post of said parallel posts of said second set having a common height that exceeds the vertical extent of said carcass in said substantially vertical plane;

a second frame mounted in interconnecting relation to said parallel posts of said second set;

said second frame being adjustably mounted to said parallel posts of said second set at any preselected height along said vertical extent of said parallel posts of said second set;

a first station second rotating device mounted to said second frame, said first station second rotating device having an axis of rotation that is angularly adjustable relative to said horizontal longitudinal axis; and said first station second rotating device mounted to second frame being mounted for counter-rotation to said first predetermined direction of rotation of said first station first rotating device mounted to said first frame.

3. The apparatus of claim 1, further comprising:

a second station including at least two second station rotatably mounted rotating devices disposed near a top end of said apparatus in transversely spaced apart relation to one another for cleaning a hoof area of said carcass.

4. The apparatus of claim 3, further comprising:

said at least two rotatably mounted rotating devices including a second station first pair of rotating devices mounted to a rear main frame of said apparatus and a second pair of second station rotating devices mounted to a forward main frame of said apparatus, said first and second pairs of second station rotating devices collectively disposed in horizontal longitudinal alignment with one another in substantially equidistantly spaced relation to one another.

5. The apparatus of claim 4, further comprising:

said first pair of second station rotating devices being mounted on a frame that is pivotally secured to said rear main frame;

said second pair of second station rotating devices being mounted on a frame that is pivotally secured to said forward main frame;

a first bias means that urges said first pair of second station rotating devices to displace in a horizontal transverse direction;

a second bias means that urges said second pair of second station rotating devices to displace in a horizontal transverse direction;

the hoof area of a carcass first encountering the first pair of second station rotating devices, momentarily pivotally urging said first pair of second station rotating devices to displace transversely out of a path of travel of the hooves against the bias of said first bias means; and said hoof area next encountering the second pair of second station rotating devices, momentarily pivotally urging said second pair of second station rotating devices to displace transversely out of the path of travel of the hooves against the bias of said second bias means.

6. The apparatus of claim 3, further comprising:

a third station including a plurality of vertically stacked third station rotating devices;

each third station rotating device having an axis of rotation that is angled in a first predetermined direction relative to said horizontal longitudinal axis at a predetermined angle.

7. The apparatus of claim 6, further comprising:

said first predetermined direction of each third station rotating device being an upward inclination relative to said horizontal longitudinal axis and said predetermined angle of each third station rotating device being about twenty five degrees (25°).

8. The apparatus of claim 6, further comprising:

a fourth station having at least one fourth station rotating device having an axis of rotation that is angled in a first predetermined direction relative to said horizontal longitudinal axis at a predetermined angle.

9. The apparatus of claim 8, further comprising:

said first predetermined direction of said at least one fourth station rotating device being a downward inclination relative to said horizontal longitudinal axis and said predetermined angle of said at least one fourth station rotating device being about twenty five degrees (25°).

10. The apparatus of claim 8, further comprising:

a fifth station having at least one fifth station rotating device having an axis of rotation that is angled in a first predetermined direction relative to said horizontal longitudinal axis at a predetermined angle.

11. The apparatus of claim 10, further comprising:

said first predetermined direction of said at least one fifth station rotating device being a downward inclination relative to said horizontal longitudinal axis and said predetermined angle of said at least one fifth station rotating device being about twenty five degrees (25°).

12. The apparatus of claim 10, further comprising:

said at least one fourth station rotating devices and said at least one fifth station rotating devices being in substantial axial alignment with one another and being collectively oriented in a downward slope of about twenty five degrees (25°) relative to said horizontal longitudinal axis of said apparatus.

13. The apparatus of claim 10, further comprising:

a sixth station having at least one sixth station rotating device having an axis of rotation that is angled in a first predetermined direction relative to said horizontal longitudinal axis at a predetermined angle.

14. The apparatus of claim 13, further comprising:

said first predetermined direction of said at least one sixth station rotating device being a downward inclination relative to said horizontal longitudinal axis and said predetermined angle being about twenty five degrees (25°).

15. The apparatus of claim 13, further comprising:

said at least one fourth station rotating device, said at least one fifth station rotating device, and said at least one sixth station rotating device being in substantial axial alignment with one another and being collectively oriented in a downward slope of about twenty five degrees (25°) relative to said horizontal longitudinal axis of said apparatus.

16. The apparatus of claim 5, further comprising:

a third station having a plurality of rotating devices rotatably mounted to said main frame;

said plurality of third station rotating devices including a plurality of horizontally disposed, vertically stacked third station rotating devices each of which is mounted for rotation about said horizontal longitudinal axis of rotation.

17. The apparatus of claim 16, further comprising:

said plurality of third station rotating devices including at least a first and second vertical stack of horizontally disposed rotating devices disposed in longitudinally spaced apart relation to one another; and respective axes of rotation of said first stack being vertically staggered with respect to respective axes of rotation of said second stack.

18. An apparatus for cleaning a carcass, comprising:

an elongate housing formed by a main frame, longitudinal, horizontal path of travel, said elongate housing including a plurality of stations where each station has at least one rotating device rotatably mounted to said main frame;

said main frame formed by a first set of parallel, longitudinally spaced apart, vertical posts and a second set of parallel, longitudinally spaced apart, vertical posts that are transversely spaced apart from said first set of posts;

said main frame having a horizontal longitudinal axis and a horizontal transverse axis, said main frame having a longitudinal extent and a transverse extent, said longitudinal extent exceeding said transverse extent;

said main frame including an overhead conveyance system for transporting a carcass in a horizontal path of travel that extends along the longitudinal extent of said main frame;

said carcass being suspended from a top of said overhead conveyance system so that said carcass lies in a substantially vertical plane under the influence of gravity as it is transported from an entrance end of said elongate housing to an exit end of said elongate housing 1 along said longitudinal, horizontal path of travel, said top of said overhead conveyance system having a height that exceeds a vertical extent of said carcass in said substantially vertical plane;

said main frame including a first station including at least two first station rotatably mounted rotating devices disposed near a top end of said apparatus in transversely spaced apart relation to one another for cleaning a hoof area of said carcass;

said at least two first station rotatably mounted rotating devices including a first station first pair of rotating devices mounted to a rear main frame of said apparatus and a second pair of first station rotating devices mounted to a forward main frame of said apparatus, said first and second pairs of first station rotating devices collectively disposed in longitudinal alignment with one another in substantially equidistantly spaced relation to one another;

said first pair of first station rotating devices being mounted on a frame that is pivotally secured to said rear main frame;

said second pair of first station rotating devices being mounted on a frame that is pivotally secured to said forward main frame;

a first bias means that urges said first pair of first station rotating devices to displace in a transverse direction;

a second bias means that urges said second pair of first station rotating devices to displace in a transverse direction;

the hoof area of a carcass first encountering the first pair of first station rotating devices, momentarily pivotally urging said first pair of first station rotating devices in a transverse direction out of a path of travel of the hooves against the bias of said first bias means; and said hoof area next encountering the second pair of first station rotating devices, momentarily pivotally urging said second pair of first station rotating devices in a transverse direction out of the path of travel of the hooves against the bias of said second bias means.

* * * * *